United States Patent [19]

Petterson et al.

[11] 4,072,503

[45] Feb. 7, 1978

[54] THERMAL TREATMENT OF LEACHING RESIDUE FROM HYDROMETALLURGICAL ZINC PRODUCTION

[75] Inventors: Stig Arvid Petterson, Skalleftehamn, Sweden; Tor Lindstad, Bjorkmyr, Norway; Frøystein Dyvik, Odda, Norway; Georg Steintveit, Odda, Norway

[73] Assignee: Det Norske Zinkkompani A/S, Odda, Norway

[21] Appl. No.: 559,706

[22] Filed: Mar. 19, 1975

[30] Foreign Application Priority Data

Mar. 21, 1974 Norway ............................... 741026

[51] Int. Cl.$^2$ .............................................. C22D 7/06
[52] U.S. Cl. ........................................ 75/14; 75/77; 75/88; 75/120

[58] Field of Search ...................... 75/120, 99, 14, 63, 75/77–79, 86–88

[56] References Cited

U.S. PATENT DOCUMENTS

| | | | |
|---|---|---|---|
| 1,466,793 | 9/1923 | Eustis et al. | 75/14 |
| 2,984,562 | 5/1961 | Kohlmeyer | 75/77 |
| 3,493,365 | 2/1970 | Pickering et al. | 75/120 |
| 3,663,207 | 5/1972 | Themelis et al. | 75/77 |
| 3,684,490 | 8/1972 | Steintveit | 75/120 |
| 3,743,501 | 7/1973 | Cusanelli et al. | 75/120 |

*Primary Examiner*—M. J. Andrews
*Attorney, Agent, or Firm*—Pennie & Edmonds

[57] ABSTRACT

Pyrometallurgical process for recovering lead, zinc and precious metals from leaching residues and precipitates occuring during the hydrometallurgical production of zinc, comprising a weak oxydizing and reducing treatment of the starting material.

13 Claims, No Drawings

THERMAL TREATMENT OF LEACHING RESIDUE FROM HYDROMETALLURGICAL ZINC PRODUCTION

The invention relates to a pyrometallurgical process for recovery of lead, zinc and precious metals from leaching residues and precipitates occuring during the hydrometallurgical production of zinc.

In the hydrometallurgical production of zinc, the raw material is usually zinc sulphide concentrate which is roasted, for example, in a conventional roasting furnaces or on belts. The roasted product usually contains 50–65% Zn in the form of zinc oxide, zinc sulphate and zinc ferrites, together with smaller quantities of lead, precious metals, iron, copper, arsenic, cadmium and antimony. Zinc oxide and zinc sulphate are readily soluble in the hydrometallurgical process normally used where diluted sulphuric acid is used as the leaching liquid, whereas zinc ferrites are practically insoluble. The roasting processes and therefore usually carried out so that formation of ferrites is avoided. It is, however, not possible to prevent the presence of a certain amount of zinc ferrite in the roasted product. In the previous conventional leaching methods, the zinc yield is usually of the order of 87–95% when the roasted material contains ca. 9–5% iron. The composition of the leaching residue naturally varies with the roasted material, but the following analyses are representative for a plurality of zinc ores:

|     |           |
|-----|-----------|
| Au  | 1 g/ton   |
| Ag  | 300 g/ton |
| Cu  | 1%        |
| Fe  | 28%       |
| Zn  | 18%       |
| Pb  | 6%        |
| Cd  | 0,2%      |
| SiO$_2$ | 6%    |
| CaO | 6%        |
| S   | 6%        |

As may be seen, the zinc content in the leaching residue is very high.

It has not previously been found possible to make use of the metal value from the leaching residue in an economical manner and therefore this has usually been tipped. The zinc losses in leaching are due partly to the zinc ferrites formed during roasting and partly to a zinc sulfate in the leaching solution which remains in the residue after filtering. The leaching residue is usually very doughy and sticky, making scrubbing and filtration difficult to carry out. Consequently, several pyrometallurgical processes for recovering the metal have been tried, such as melting down in reverberatory furnaces under reducing conditions to fume off zinc and lead together with other volatile metals. The fumed metals are oxidized to metal oxides which are separated by suitable filters. Another method is to treat the material in a rotary furnace together with coke at high temperature, whereupon zinc and lead have also been driven off. In regard to these methods, see "Zinc" of C. H. Mathewson, Reinhold Publishing Corporation, New York, page 190–191.

Other previously known methods for recovering the metal value in the leaching residues, in addition to conventional leaching with acids, comprise the admixture of reducing agents, e.g. coke or carbon powder, into the leaching residues, whereafter Zn and Pb are fumed off by reduction and melting down, the metals being subsequently oxidized and separated in particle filters. See, for example, the article in the "Metal Bulletin Monthly" April 1971, page 8, the German Auslegeschrift 1040256 and "Joint Meeting MMIJ-AIME" 1972, Tokyo (lecture by S. Sato). According to the article in "Metal Bulletin Monthly" the leaching residues are mixed with pulverised coke, subsequent to which the material is pelletized and fed into a rotary furnace and heated to 1100° C, Zn and Pb being reduced and driven off. The metal vapors are oxidized to ZnO and PbO and the particles are subsequently separated in a filter.

According to the German Auslegeschrift 1040256, the leaching residue is treated with a soda slag while admixing a reducing agent, with subsequent smelting and reduction in a so-called "Kurztrommelofen", Pb and Zn being driven off.

According to S. Sato, the leaching residue is smelted in an electric furnace, the addition of coke constituting not less than 45% of the material supplied. Zn and Pb are driven off here in a similar manner as described hereinabove.

The above-mentioned methods are expensive as they require a great deal of energy. Furthermore one is also dependent on advanced particle filters. A third disadvantage of the said processes is that Pb and Zn are recovered in the form of a mixed oxide, and possible precious metals can only be recovered with difficulty if the leaching residue does not contain a certain amount of copper which can dissolve precious metals.

To decrease the zinc losses, the roasting material can be leached with a more concentrated sulphuric acid solution whereby the leaching yield for zinc can be increased to 98–99%, 80–90% of the iron content being dissolved at the same time, however. Such a process is disclosed in Norwegian Pat. No. 108,047. According to this process, an undissolved leaching residue is obtained which contains relatively high proportions of lead and silver.

The iron-rich, zinc solution is purified by precipitating the iron in the presence of potassium, sodium or ammonium ions, the so-called jarosite-precipitation with an approximate formula:

|                |                       |
|----------------|-----------------------|
| K              |                       |
| Na             | [Fe$_3$(SO$_4$)$_2$(OH)$_6$] |
| NH$_4$         |                       |

The undissolved and precipitated products can have the following analyses:

| Pb-Ag-leaching residue |              | Jarosit-precipitation |            |
|------------------------|--------------|-----------------------|------------|
| Zn                     | 4% (weight)  | Zn                    | 4% (weight)|
| Fe                     | 12%          | Fe                    | 30%        |
| SO$_4$                 | 35%          | SO$_4$                | 30%        |
| Pb                     | 15%          | Pb                    | 2%         |
| Ag                     | 1000 g/t     | NH$_4$                | 1,5%       |
| SiO$_2$                | 15%          | SiO$_2$               | 3%         |
| the remainder mainly oxygen |          | As                    | 0,3%       |
|                        |              | Sb                    | 0,3%       |
|                        |              | Ag                    | 200 g/ton  |
|                        |              | Cu                    | 0,3%       |
|                        |              | Cd                    | 0.04%      |

The metal values in the lead-silver leaching residue can be recovered by heating together with conventional lead raw materials in conventional lead processes, however, due to the low lead content, the material is not very attractive, and profitability will be low. The precipitations from the leaching process have usually been tipped hitherto. However, the precipitations from the leaching liquid contain a certain amount of copper, arsenic, antimony and cadmium, (see, for example, Norwegian Pat. No. 123,248) and tipping of such material is an environmental hazard, inasmuch as such heavy metals can be leached out to a certain extent when exposed to the environment.

Surprisingly it has now been found that the said disadvantages can be eliminated by heating the residues from hydrometallurgical zinc production in a reactor, the residues consisting predominantly of a leaching residue and/or iron-rich precipitates from the leaching solution which contain zinc, lead, copper, precious metals and impurities substantially in the form of sulphides, sulphates, oxides and ferrites, under non-reducing conditions at oxygen partial pressures such that the lead present forms lead oxide, the material subsequently being reduced by addition of a reducing agent in an amount such that lead and zinc are substantially reduced while the reduction of iron is avoided. Zinc is reduced and vaporized in elemental form, and the zinc in the discharge gases is thereafter oxidized and separated.

In order to prevent the sulphide formation of lead sulphide, which is comparatively volatile, the oxygen partial pressure in the gas during the non-reducing heating, and to oxidize the sulphates and sulphides, must exceed a pressure which is defined by the equation:

$$\log P_{O_2} = 1,76 - 14,37 \cdot 1000/T.$$

where T is stated in Kelvin. The equation is calculated on the basis of the equilibrium condition $PbO + SO_2 = PbS_{(g)} + 1,5 O_2$, an equilibrium constant K thus being obtained, where $$K = \frac{a_{PbS} \cdot (P_{O_2})^{1.5}}{a_{Pb} \cdot P_{SO_2}},$$

where the activity of $PbS = 1$ and for PbO is assumed $= 0,1$ (value based on experience) and $P_{SO_2} \leq 0,2$ atm which constitutes the maximum conceivable sulphur dioxide pressure, whereby $p_{O_2} = (0,02 K)^{2/3}$ or the above-mentioned approximate linear equation. The equation is applicable for temperatures between 900°-1350° C, if the partial oxygen pressure falls below the equivalent of this relationship, lead sulphide will be formed and vaporized together with zinc which is driven off as metal. This signifies an undesirable loss of lead. After sulphides and sulphates have been oxidized the material is treated with a reducing agent at a partial oxygen pressure which is held at a maximum of $\log P_{O_2} = 5,7 - 16,7 (1000/T) + 2 \log a_{PbO}$, $a_{PbO}$ denoting the activity of lead oxide in the molten slag formed in the reactor. The lead oxide in the slag is thereby reduced to lead and forms a lead melt under the slag. The formula has been obtained on the basis of $2PbO_{(l)} = 2Pb_{(l)} = O_2$, $$K \text{ then being} = \frac{(a_{Pb})^2 \cdot P_{O_2}}{(a_{PbO})^2}$$

where $a_{Pb} = 1$ and $P_{O_2} = K \cdot (a_{PbO})^2$, and at the temperature of 1200°-1350° C $\log K = 5,7 - 16,7 \cdot 1000/T$ is obtained. The activity value inserted for PbO is naturally dependent on the desired degree of expulsion. If it is assumed that the activity coefficient for lead oxide in the slag is between 0,5 and 1 and that lead is reduced to a content of 1%, an activity value of between 0,0015 and 0,003 is obtained. Insertion of the activity value 0,0015 gives the relationship $\log P_{O_2} = 0,1 - 16,7 \cdot 1000/T$. Finally, it is an essential feature of the process that iron is not reduced from the slag, and the partial oxygen pressure over the material during the reduction must not fall below the value obtained with the relationship $\log P_{O_2} = 4,0 - 23,4 \cdot 1000/T$, therefore consideration being taken of the activity of the iron in the slag. This formula has been obtained on the basis of $2FeO = 2 Fe_{(s)} + O_2$ from which is obtained $$K = \frac{(a_{Fe})^2 \cdot P_{O_2}}{(a_{FeO})^2} \text{ or } P_{O_2} = \frac{K \cdot (a_{FeO})^2}{(a_{Fe})^2}$$

where $a_{Fe} = 1$ and $P_{O_2} = K (a_{FeO})^2$. If K is calculated as a linear relationship, $\log K = 4,3 - 23,4 \cdot 1000/T$. Furthermore if $a_{FeO}$ is taken to be 0,7 (which from experience is the highest activity) attainable in the slag, the relationship is achieved. During reduction, fumed-off zinc is oxidized after evaporation and may be separated together with possible arsenic in a suitable filter. Expelled sulphur dioxide is recovered in a conventional manner from discharge gases and is used for producing sulphuric acid or liquid sulphur dioxide. The lead metal formed, which is drawn off continuously from the reactor dissolves the silver-content of the leaching residue. The remaining slag, which mainly contains iron, silicon alkali earth metals and oxygen, is drawn off. This slag can without risk of dissolution, be deposited in the environment. Preferably, slag-forming materials, which subsequently melt, are introduced to the reactor prior to the residual material. The slag in the reactor should, on discharge, be of a composition corresponding to 20-70% $SiO_2$, 30-75% $FeO_2$ and 10-40% MeO, where Me denotes calcium, magnesium or zinc. The composition should preferably be 37-40% FeO, 30-33% $SiO_2$ and 28-30% MeO. When a mixture of leaching residue and iron precipitates from the leaching solution is used, silicon dioxide and oxides of alkali earth metals such as lime, slaked lime and dolomite are supplied so as to prevent substantial change of the slag composition, during the process, and to provide a suitable composition of the slag.

The reactor used for the process can consist of an elongate furnace where the material is introduced on one end, where it is split and melted to a slag which flows towards the other end of the furnace, where reducing agents are added and suitable conditions for reducing lead are maintained. The furnace can be heated by means of electrical resistance heating with electrodes of e.g. the Soderberg type in the melt. Alternatively, heating can take place by means of an oxygen fuel flame, this leads to the formation of greater amounts of exhaust gases, however, and the problem of gas scrubbing arises in consequence. Thus the method according to the invention can be suitably carried out in an electric furnace having a long length in relation to its width and where the electrodes are disposed in line one after the other. A suitable number of electrodes is three or possibly four, and they are supplied with 3-phase alternating current. Such a furnace construction facilitates the introduction of material so that melting of the material introduced can be carried out under the above-described oxidizing conditions in half of the length of the furnace, for example, while reduction of lead and zinc is carried out in the remainder of the furnace after the addition of coke. The gas is preferably withdrawn by suction from the furnace at the material input side. Air necessary for oxidization is supplied in a suitably controlled manner through openings located substantially in the first part of the furnace. For improved heating economy, the air can be preheated. The metallic sulphates incorporated in the leaching residue and the precipitates are split to oxide and sulphur dioxide in order to prevent the formation of lead matte (PbS). It is necessary to maintain good contact between the material supplied and the oxygen-rich atmosphere in the furnace. This contact can be further improved in that at least a part of the air is admixed with material supplied. It is thereby possible to direct the flow of supplied material toward the flow of gas in the furnace, much improved contact being thereby maintained between the furnace atmosphere and the material supplied. The material supplied can be suitably introduced to the furnace by means of supply apertures around the electrode in the oxidizing zone. In consideration of the continuous working principle of the furnace, the supplying devices should be such that it is possible to vary the composition of the material supplied at different locations in the furnace coke, for example, being added only at the last electrode. Since the sulphate, as previously stated, requires much heat for oxidizing, good heat transference to the residual material supplied must be provided. The said heating effected partly by radiation from the bath, and partly burning CO formed in the reduction zone. To ensure a sufficient supply amount of heat to the furnace, an oil or gas fuel burner can also be provided. The fuel flame can be directed towards the leaching residue supplied, so that heating of material supplies is carried out as rapidly as possible, since the oxidizing of the sulphate stored preferably takes place before it reaches the surface of the bath. Another type of furnace well suited to the process according to the present invention is a so-called Kaldo-furnace, which consists of a reactor rotating at an angle to the horizontal and vertical planes. A slag of the above mentioned composition is melted in the furnace by means of an oilburner, whereafter material is supplied to the furnace, the partial oxygen pressure being regulated at the same time in accordance with the above-stated values. The sulphide and sulphate supplied are thereby oxidized very effectively and a lead containing slag is obtained. After a sufficient amount of material has been supplied to the furnace, the partial oxygen pressure is reduced to the desired reducing values, and a reducing agent such as coke is added at the same time. A lead melt is thereby formed in the furnace during simultaneous fuming-off of the zinc content of the material. When a rotating furnace is used, the process will, in fact, be discontinuous, on the other hand, very quick reaction cycles are obtained for which reason the process is also very suitable for treating large amounts of leaching residue. This type of furnace permits very good heating economy during the process, and at the same time, comparatively simple control of conditions. Other furnace types can also be used, to advantage, for example, fluidizing furnaces and furnaces heated by induction. Even further suitable furnaces are conventional revolving furnaces, e.g. Kurztrommelofen. Coke is suitable as a reducing agent, however, other solid reducing agents can be used, e.g. coal, peat and liquid or gaseous reducing agents such as petroleum products.

The invention is further explained hereinbelow with reference to the following examples. In Example 1 a process for melting a mixed lead silver leaching residue is described, and a jarosit-precipitate obtained after leaching by direct precipitation before separation of the leaching residue. In Example 2 melting of a mixture of a lead/silver residue with a jarosite-precipitate in a somewhat different mixture proportion is described. In Example 3 a melt of a mixture of lead/silver residue from a zinc leaching and an oxidic presipitate is described, and in Example 4 treatment of residue from a neutral leaching or leaching with a weak sulfuric acid is described. All the examples include a process carried out in an electric furnace having three Soderberg electrodes. The length of the furnace in relation to its width was 14 × 4 m in Example 1 and 3 and 8 × 2,5 m in Examples 2 and 4. The material was introduced between the first and the second electrode and constituted in all cases the above mentioned residual material from zinc leaching together with slag, quartz and oxides of alkali earth metals. Coke was introduced between the second and third electrodes. Slag was removed from the trailing end of the furnace and exhaust gases were withdrawn from its loading end. The examples are not intended to be restrictive, and it should be apparent to a person skilled in the art that the process variables can be transferred to other furnace types without altering the process essentially.

EXAMPLE 1

For the experiment the electric furnace was supplied with 9350 kg $h^{-1}$ of a mixed leaching residue and jarosit-precipitate. The mixture contained 90 kg $h^{-1}$ water. The furnace was further supplied with 3250 kg $h^{-1}$ slag having 80 kg $h^{-1}$ water with a low content of FeO, 380 kg $h^{-1}$ quartz and 440 kg $h^{-1}$ coke. The furnace was supplied with 3000 $Nm^3h^{-1}$ air at different points along the furnace. From the furnace were taken 5700 $Nm^3h^{-1}$ gas and with this gas 820 kg $h^{-1}$ particles, 8000 kg $h^{-1}$ slag and 440 kg $h^{-1}$ raw lead. The result may be seen from the following analyses result. Electrical effect was 8400 KW.

| Analyses: | Leaching residue and precipitate | FeO[2] lean slag supplies | Raw lead | Particles in exhaust gas | slag produced |
|---|---|---|---|---|---|
| Pb% | 5,5 | | 96 | 20 | 0,9 |
| Zn% | 5 | | | 20 | 4 |
| Cd% | 0,06 | | | 0,6 | |
| Cu% | 0,4 | | 0,8 | | |
| Ag% | 0,033 | | 0,55 | | |
| As% | 0,25 | | | | |
| Sb% | 0,2 | | 2,5 | | |
| Fe%[3] | 26 | | | 14 | |
| FeO% | | 2 | | | 38 |
| $SiO_2$ | 6 | 38 | | 1 | 27 |
| CaO% | 1 | 43 | | | 18 |
| MgO% | 0,3 | 7 | | | 3 |
| $Al_2O_3$ | 2 | 10 | | | 6 |
| $S_{total}$ | 12 | | | 12 | 1 |
| Difference | 41,2[1] | | | | |

| Exhaust gas analyses | | | |
|---|---|---|---|
| $SO_2$ | 11,5% | $H_2$ CO and $O_2$ all closer to 0% | |
| $CO_2$ | 14,5% | $As_4O_6$ (g) 4,1 g/$Nm^3$ | |
| $H_2O$ | 30% | | |
| $N_2$ | 44% | | |

[1]The differences are essentially N, H and O bonded in jarosite, sulphates and oxides.
[2]In supplying this slag, the intention is to provide the process with CaO, MgO and $SiO_2$. It is possible to supply slag lime, slag dolomite and quartz, instead, however.
[3]Fe bonded as oxide, sulphate and jarosite.

EXAMPLE 2

In this experiment a leaching residue was used in an amount of 2120 kg $h^{-1}$ together with 1060 kg $h^{-1}$ jarosite precipitate totally containing 30 kg $h^{-1}$ water. Further supplied to the furnace were 190 kg $h^{-1}$ calcinated dolomite, 190 kg $h^{-1}$ coke and 1950 $Nm^3 h^{-1}$ air. From the furnace were taken 3050 $Nm^3 h^{-1}$ exhaust gases at 1000° C together with 360 kg $h^{-1}$ particles, 1490 kg $h^{-1}$ slag and 270 kg $h^{-1}$ raw lead. The results may be seen from the following analyses results. Electrical effect was 2750 KW.

Analyses:

| | Lead silver leaching residue | Jarosite precipitate | Raw lead | Particles in exhaust gas | Slag produced |
|---|---|---|---|---|---|
| Pb% | 16 | 2 | 95 | 27 | 0,9 |
| Zn% | 5 | 5 | | 18 | 6 |
| Cd% | 0,06 | 0,04 | | 0,5 | |
| Cu% | 0,3 | 0,3 | 0,5 | | |
| Ag% | 0,07 | 0,02 | 0,55 | | |
| As% | 0,2 | 0,3 | | | |
| Sb% | 0,4 | 0,4 | 3,9 | | |
| Fe%[2] | 12 | 28 | | 14 | |
| FeO% | | | | | 43 |
| SiO$_2$% | 15 | 4 | | 1 | 24 |
| CaO% | 3,5 | 0,5 | | | 13 |
| MgO% | 0,5 | | | | 6 |
| Al$_2$O$_3$% | 3 | 0,5 | | | 5 |
| S$_{total}$% | 12 | 11 | | 12 | 1 |
| Difference % | 32,0[1] | 48[1] | | | |

Exhaust gas analyse:

| SO$_2$ | 8% | H$_2$, Co and O$_2$ all close to 0% |
|---|---|---|
| CO$_2$ | 12% | As$_4$O$_6$(g) 2,8 g/Nm$^3$ |
| H$_2$O | 28% | |
| N$_2$ | 52% | |

[1] The difference is essentially N, H and O bonded in jarosite, sulphates and oxides.
[2] Fe bonded as oxide, sulphate and jarosite.

EXAMPLE 3

For this experiment the furnace was supplied with a mixed lead/silver leaching residue, together with an oxidic percipitate in an amount of 6300 kg $h^{-1}$ together with 600 kg $h^{-1}$ water. The furnace was further supplied with 600 kg $h^{-1}$ slaked lime, 608 kg $h^{-1}$ slaked dolomite, 400 kg $^{-1}$ coke and 2900 $Nm^3 H^{-1}$ air. From the furnace were taken 3700 $Nm^3 h^{-1}$ exhaust gases having 650 kg $h^{-1}$ particles, 6800 kg $h^{-1}$ slag and 310 kg $h^{-1}$ raw lead. The result may be seen from the following analyses result. The electrical effect was 5600 KW.

Analyses:

| | Lead/leaching residue and oxidic precipitate | Raw lead | Particles in exhaust gas | Slag produced |
|---|---|---|---|---|
| Pb% | 7 | 96,5 | 20 | 0,8 |
| Zn% | 6 | | 20 | 3,5 |
| Ag% | 0,05 | 0,6 | | |
| As% | 0,25 | | | |
| Sb% | 0,3 | 2,8 | | |
| Fe%[2] | 39 | | 16 | |
| FeO% | | | | 45 |
| SiO$_2$ | 8 | | 1 | 30 |
| CaO% | 1,5 | | | 16 |
| MgO% | 0,5 | | | 4 |
| Al$_2$O$_3$ | 2 | | | 2 |
| S$_{total}$ | 4,5 | | 14 | 0,5 |
| Difference % | 30,9[1] | | | |

Exhaust gas analyses:

| SO$_2$ | 3% | H$_2$ CO and O$_2$ close to 0% |
|---|---|---|
| CO$_2$ | 20% | As$_4$O$_6$(g) 4,3 g/Nm$^3$ |
| H$_2$O | 15% | |
| N$_2$ | 62% | |

[1] The difference is essentially H and O bonded in sulphates, oxides and hydrooxides.
[2] Fe bonded as oxide and sulphate.

EXAMPLE 4

For this experiment the furnace was supplied with 2000 kg $h^{-1}$ leaching residue from a mildly basic leach of reduced material. Comparatively large amounts of zinc were thus obtained in the residue. The furnace was further supplied with 340 kg $h^{-1}$ quartz, 160 kg $h^{-1}$ slaked lime, 100 kg $h^{-1}$ cokes and 500 $Nm^3 h^{-1}$ air. From the furnace were taken 800 $Nm^3 H^{-1}$ exhaust gas together with 510 kg $h^{-1}$ particles, 1350 kg $h^{-1}$ slag and 80 kg $h^{-1}$ raw lead. The electrical effect was 800 KW. The result may be seen from the following analyses results.

Analyses:

| | Residue | Raw lead | Particles in exhaust gases | Slag produced |
|---|---|---|---|---|
| Pb% | 6 | 99,5 | 5 | 0,8 |
| Zn% | 21 | | 52 | 10 |
| Ag% | 0,016 | 0,3 | | |
| As% | 0,04 | | | |
| Sb% | 0,05 | 0,2 | | |
| Fe%[2] | 22,4 | | 8 | |
| FeO% | | | | 40 |
| SiO$_2$% | 3 | | 1 | 30 |
| CoO% | 1 | | | 14 |
| MgO% | 1,5 | | | 3 |
| Al$_2$O$_3$% | 0,3 | | | 0,5 |
| S$_{total}$% | 10,5 | | 7 | |
| Difference % | 34,2[1] | | | |

Exhaust gas analyses:

| SO$_2$ | 14% | H$_2$, CO and O$_2$ all close to 0% |
|---|---|---|
| CO$_2$ | 34% | As$_4$O$_6$(g) 0,7 g/Nm$^3$ |
| H$_2$O | 3% | |
| N$_2$ | 49% | |

[1] The difference is essentially 0 bonded in sulphates and oxide in the particles.
[2] Fe bonded as Fe$_2$O$_3$ in the residue and as sulphate and oxide in the particles.

Having thus described our invention, we claim:

1. A method of treating residual material from the hydrometallurgical production of zinc which material consists of the leaching residue, iron precipitates from the leaching solution or mixtures of both from such production and which material contains zinc, lead and iron which method comprises heating and melting said residual material in a reactor under oxidation conditions at partial oxygen pressure to form lead oxide from the lead present in said residual material by supplying air to said material during such heating; said partial oxygen pressure being at least sufficient to prevent formation of lead sulphide; thereafter heating the oxidized material to fume off zinc in its elemental form by the addition of a reducing agent in a quantity sufficient to provide a partial oxygen pressure low enough to substantially reduce the lead and zinc yet high enough to avoid the simultaneous reduction of iron present; thereafter recovering at least the zinc from the fume and the lead as a melt; and the iron remaining in a slag.

2. A method according to claim 1, characterized in that the partial oxygen pressure during oxidation exceeds a pressure which is defined by the equation log $P_{O_2} = 1,76 - 14,37 \cdot 1000/T$ where T is given in Kelvin.

3. A method according to claim 1, characterized in that the partial oxygen pressure during reduction is kept at a maximum of a partial oxygen pressure of log $P_{O_2} = 5,7 - 16,7 \cdot 1000/T + 2 \log a_{PbO}$, where a PbO denotes the activity of the lead oxide in the slag above the lead melt.

4. A method according to claim 3, characterized in that the oxygen partial pressure during reduction is maintained at not more than log $P_{O_2} = 0,1 - 16,7 \cdot 1000/T$.

5. A method according to claim 1, characterized in that the partial oxygen pressure during reduction is maintained at not less than log $P_{O_2} = 4,0 - 23,4 \cdot 1000/T$.

6. A method according to claim 1, characterized in that the residual material comprises 1 part leaching residue to 0,5-5 parts iron precipitate from the leaching solution.

7. A method according to claim 6, characterized in that the residual material comprises 1 part leaching residue to 0,5-1 parts iron precipitates.

8. A method according to claim 1 characterized in that the residual material is introduced into one end of an elongate furnace to a first zone where the material is first oxidized and thereafter flows with the slag to a second zone of the furnace where a reducing agent is supplied, said air for oxidation being supplied at said first zone.

9. A method according to claim 8, characterized in that the residual material is melted in an elongate furnace which is heated by means of electrodes submerged in the melt.

10. A method according to claim 8, characterized in that the elongate furnace is heated by means of an air/fuel flame.

11. A method according to claim 1, characterized in that the reaction is carried out in two steps in a rotating furnace.

12. A method according to claim 1, characterized in that coke is added as reducing agent.

13. A method according to claim 1, characterized in that the reduction is carried out at a temperature between 1200° and 1350° C.

* * * * *

UNITED STATES PATENT AND TRADEMARK OFFICE
CERTIFICATE OF CORRECTION

PATENT NO. : 4,072,503
DATED      : February 7, 1978
INVENTOR(S): Stig Arvid Petersson et al.

It is certified that error appears in the above-identified patent and that said Letters Patent are hereby corrected as shown below:

Column 3, line 65, "degree of explulsion" should read

--degree of expulsion--.

Column 4, line 53, "Soderberg type in the melt" should read

--Soderberg type submerged in the melt--.

Correct the spelling of the first-listed inventor's name to --Stig Arvid Petersson--.

Signed and Sealed this

Twenty-seventh Day of June 1978

[SEAL]

Attest:

RUTH C. MASON
Attesting Officer

DONALD W. BANNER
Commissioner of Patents and Trademarks